May 14, 1935.  A. P. BEREJKOFF  2,001,565

INTERPOLATING DEVICE

Filed Jan. 18, 1934

Inventor:
Anatole P. Berejkoff,
by Harry E. Dunham
His Attorney.

Patented May 14, 1935

2,001,565

UNITED STATES PATENT OFFICE 2,001,565

INTERPOLATING DEVICE

Anatole P. Berejkoff, Schenectady, N. Y., assignor to General Electric Company, a corporation of New York Application January 18, 1934, Serial No. 707,230

5 Claims. (Cl. 250—39)

My invention relates to interpolating devices and more particularly to such devices for use in connection with heterodyne frequency indicating systems.

In heterodyne frequency indicating systems an oscillation generator is commonly employed having a frequency which is adjustable over the range of frequencies which it is desired to indicate. The frequency adjusting device of this oscillator, which I shall herein refer to as the "local oscillator" commonly is calibrated in terms of frequency, or in arbitrary terms, which may be interpreted into terms of frequency by reference to a proper calibration chart or curve.

To determine the frequency of oscillations the frequency of which is unknown, oscillations from the local oscillator are caused to combine with the unknown oscillations to produce a beat note. This beat note is detected in any suitable way as by means of headphones. The local oscillator is then so adjusted that the beat note disappears or becomes of zero frequency. The unknown frequency is then equal to the frequency of the local oscillator and may be determined from the calibration of the local oscillator.

Difficulty is experienced, however, in determining the exact adjustment of the local oscillator at which the "zero beat" is produced. This is due to the fact that the ear is insensitive to frequencies in the neighborhood of zero. Because of this difficulty it is common so to adjust the local oscillator that a beat frequency of definitely recognizable frequency is produced, read the dial, then turn the adjusting device through the "zero beat" position to a position in which the same definitely recognizable frequency is produced, and then again read the dial. The zero beat position may then be determined by interpolating between these two readings.

An object of my invention is to provide improved means whereby this interpolation may be automatically effected, and whereby the zero beat position may be read directly from the calibration scale.

Figure 1:
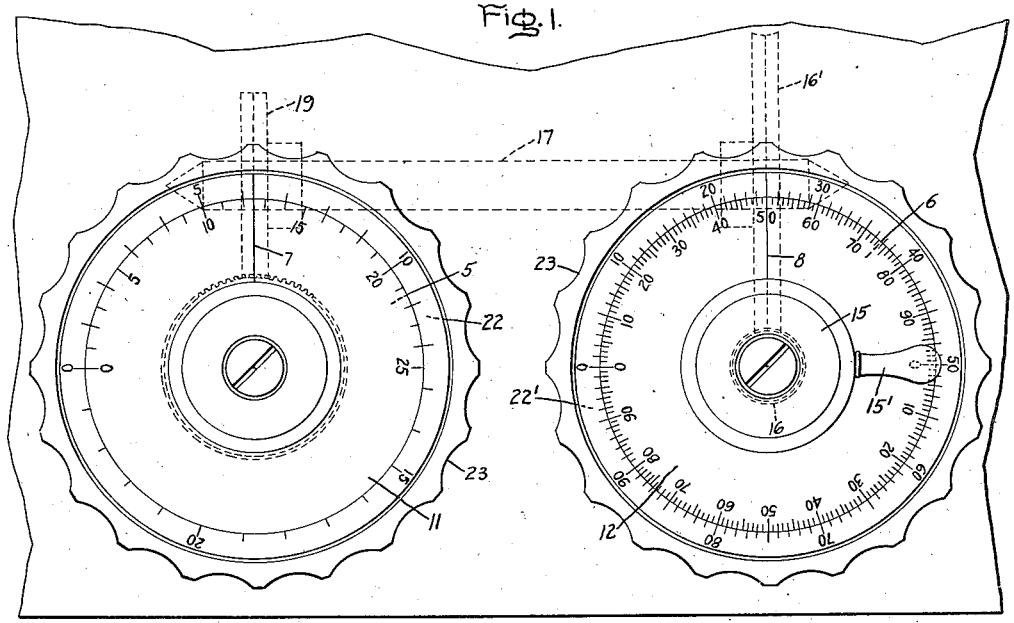
Figure 2:
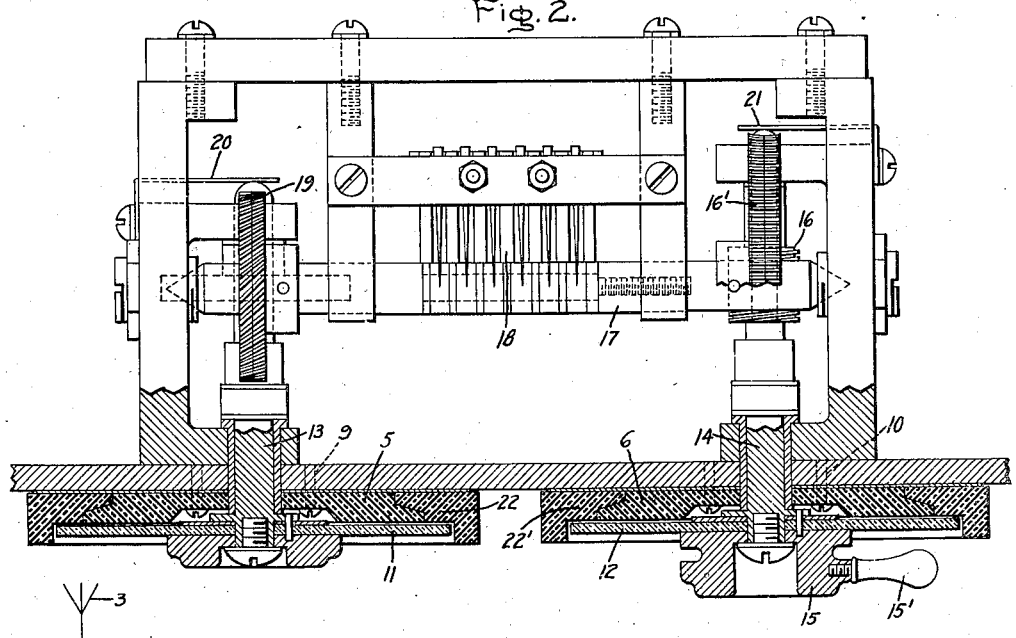

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents the calibration dials employed in accordance with my invention; Fig. 2 shows means whereby these dials are interconnected; and Fig. 3 indicates the use of my invention in a system for frequency determination.

Figure 3:
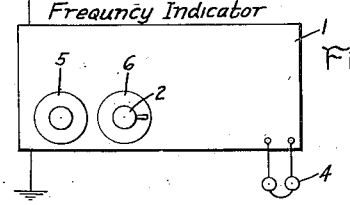

The rectangle of Fig. 3 of the drawing represents a frequency indicator comprising a local oscillator the frequency of which is adjusted by means of an adjusting device 2 and to which oscillations of unknown frequency may be supplied by means of a connection which is conventionally shown in the drawing as an antenna 3. These oscillations are caused to combine, either in the local oscillator itself, or in a separate detector, as desired, with the oscillations produced by the local oscillator thereby to produce a beat note which may be detected by means of the headphones 4. The frequency adjusting device 2 of the oscillator may of course be connected with any suitable frequency determining element of the oscillator circuit such as a reactance or condenser which is so constructed as to produce a corresponding frequency change, and is provided with a number of dials indicated by the circles 5 and 6, whereby the frequency produced by the local oscillator may be determined.

These dials 5 and 6 are better shown in Figs. 1 and 2. They are calibrated about their periphery as indicated in Fig. 1 and have cooperating therewith hair lines 7 and 8 respectively which are carried upon members which are fixed to the shafts of the frequency determining device, and rotatable over the dials 5 and 6. This is better shown in Fig. 2 where the dials 5 and 6 are shown as fixed to the mounting panel of the apparatus by means of screws 9 and 10 and in which are shown plates 11 and 12 which are adapted for rotation over the dials 5 and 6 respectively. The circular plates 11 and 12, of course, carry upon their inner surfaces, adjacent to dials 5 and 6, the hair lines 7 and 8. These plates are securely attached to shafts 13 and 14, the latter of which is provided with a knob 15 having a projection 15' thereon whereby it may be readily rotated by the finger of the operator. This shaft 14 carries a worm gear 16 which cooperates with a worm wheel 16' mounted upon the shaft 17 of a variable condenser 18, the latter of which may comprise the frequency determining element of the local oscillator. The shaft 13 carrying the plate 11 is likewise geared to the shaft 17 by means of suitable spiral gears one of which is indicated at 19. Spring members 20 and 21 bearing against the ends of the shafts 13 and 14 are provided to prevent longitudinal displacement, or play, of these shafts. Upon rotation of the knob 15 it will be seen that the condenser 18 is varied in position and also that the hair line on the member 12 is moved over the dial 6, and further that the hair line on the member 11 is moved over the scale 5.

The particular calibration illustrated on the scales 5 and 6 and the gear ratio between the respective hair line carrying members 11 and 12 is such that the entire frequency range over which it is desired, with the instrument illustrated, to indicate frequencies is divided into 2500 equal parts. This will be seen from the facts that the scale of the dial 5 extends only over a semi-circumference which is divided into twenty-five equal parts, whereas the scale of dial 6 is divided into two semi-circumferences each of which is divided into one hundred equal parts, while the two hair line carrying members 11 and 12 are geared together by a ratio of 25:1. The gear 19 has a spiral cut to a 45° pitch so that the ratio between the shafts 13 and 17 is 1:1 whereas the ratio between the shafts 17 and 14 is 1:25. Thus upon each movement of the hair line 8 from zero to 100 the hair line 7 moves over one division of the scale of dial 5, or twelve and one-half rotations of the knob 15 causes the hair line 7 to move over the entire scale of dial 5. Thus by the use of these scales and a proper frequency calibration chart the local oscillator can be adjusted to produce any desired frequency within the range.

For example, let us suppose that it is desired to adjust the frequency of the local oscillator for 30,000 kilocycles and that our calibration curve or chart gives the scale reading corresponding to this frequency as 1255. The knob 15 will then be rotated until the hair line 7 occupies the position corresponding to 12 plus, and the hair line 8 occupies the position corresponding to 55. The frequency of the oscillator will then be 30,000 kilocycles. It is observed that the units and tens digits of the dial reading are read from the dial 6 and the hundreds and thousands digits are read from the dial 5.

In determining the unknown frequency of oscillations received on the antenna 3, for example, it will of course be understood, as pointed out above, that the knob 15 is rotated until a definitely recognizable beat note is obtained. The dials may then be read, and the knob 15 again rotated, through the zero beat position, until the same definitely recognizable frequency is obtained. The dial is then again read. Were no other means provided it would be necessary to interpolate between these two dial readings to obtain the exact dial reading corresponding to the position of the zero beat. In order that this zero beat position may be read directly from the instrument two additional dials are provided, these dials being indicated at 22 and 22'. These dials are concentric with the dials 5 and 6 respectively and have calibrations about their inner periphery to cooperate with the calibrations of the dials 5 and 6. These dials are also serrated about their outer periphery as shown at 23 so that they may be readily grasped by the hand of the operator and rotated. Their arrangement in the apparatus is further illustrated in Fig. 2 where they are shown closely fitted with the dial members 5 and 6 and arranged for free rotation about the dials 5 and 6.

It will be observed that the inner periphery of each of the dials 22 and 22' are divided in divisions of value equal to the divisions of the cooperating scale 5, 6 respectively, but that the scale divisions of the dials 22 and 22' are each of double the length of the scale divisions of the dials 5 and 6. Thus while a semi-circumference of the dial 5 is divided into twenty-five equal parts the entire circumference of the dial 22 is divided into twenty-five equal parts. Similarly while the circumference of the dial 6 is divided into two hundred equal parts, the entire circumference of the dial 22' is divided into one hundred equal parts.

The position of zero beat between the oscillations produced by the local oscillator and received oscillations of unknown frequency may now be determined immediately from the scales in the following manner. The operator turns the knob 15 until he hears a definitely recognizable frequency in the headphones 4. He then moves both of the outer dials to such positions that the readings of the outer dials under the hair lines is the same as the readings of the inner corresponding dials under the hair line. He then moves the knob 15 until he again obtains the definitely recognizable frequency at a different position of the dials. The position of zero beat may then be read directly from the outer dial, and the unknown frequency may be determined from this reading. If the operator desires to cause the local oscillator to produce the zero beat he will then set the hair lines to the intermediate position on the inner dials which read the same as the last previous reading on the outer dials.

For a specific example, let us suppose that the operator in rotating the knob 15 obtains a definitely recognizable frequency at a certain position. Assume that the readings of the inner dials are then 1250. He sets the outer dials at this same reading. He then rotates the knob 15 until he obtains the definitely recognizable frequency at a different position of the dial. Let us suppose that this is at the position where the inner dials read 1110. The outer dials will then read 1180 which corresponds to the reading on the inner dial exactly half way between the 1110 and 1250 calibrations. Thus the unknown frequency may be determined directly from the reading 1180 of the outer dial.

It may happen, however, in interpreting the zero reading, that is, in the example given, the reading 1180, into terms of frequency, that we may find that the chart does not give the exact frequency corresponding to this particular reading. For example the chart may give a frequency, for example $f_1$, corresponding to a dial reading of, let us say, 520 and a different frequency $f_2$ corresponding to a dial reading of 1620, no intermediate dial readings being given. It is necessary therefore to calculate the frequency corresponding to the reading 1180 from the calibration points 520 and 1620 given by the chart. The outer dials have been found to be extremely useful in effecting this calculation. In effecting this calculation by the use of the dials the operator first sets the hair lines at the reading 520 of the inner dials. He then sets the zeros of the outer dials under the hair lines. He then moves the hair lines to the reading 1180 on the inner dials and notes the reading of the outer dial. This reading may be 330. He then moves the hair lines to the upper calibration point 1620 given by the chart and again reads the outer dials. Let us say that this reading is 550. The unknown frequency is then $$f_1 + \frac{330}{550}(f_2 - f_1).$$

It will of course be understood that the particular calibration shown in the drawing is presented by way of clearly indicating the principles involved and is applicable only in the event that the frequency determining device has a linear operating characteristic. My invention, however, is in no wise limited to the particular calibration, or form of calibration, shown. For example, the condenser 18 may be one which varies the frequency of the oscillator in a non-linear manner, as, for example, logarithmically. The dials 5 and 6 as thus employed will be calibrated accordingly and the outer dials similarly calibrated with scales of suitably greater value.

While in the drawing I have shown headphones as the means for definitely recognizing the beat frequency produced, it will of course be understood that any suitable auxiliary equipment may be employed for rendering a particular frequency readily distinguishable. For example a filter may be included in the circuit of the headphones which is sharply resonant at the beat frequency to be passed whereby the desired beat frequency is heard in the headphones with a maximum intensity. Further an additional local oscillator of audio frequency may be employed, the oscillations of which are caused to beat with the low frequency oscillations the frequency of which is to be recognized. In this way the local high frequency oscillator may be adjusted until zero beat between the two low frequencies is produced, this point being very readily recognizable by use of the headphones. Any other means to facilitate the recognizing of a definite frequency may of course be employed.

While I have shown a particular embodiment of my invention it will of course be understood that I do not wish to be limited thereto since various modifications may be made both in the operating mechanism shown and in the scales illustrated without departing from the spirit and scope of my invention. I therefore contemplate by the appended claims to cover any such modifications as fall within the true spirit and scope of my invention.

What I claim as new and desire to secure by Letters Patent of the United States is:

1. The combination of means to produce a beat frequency between oscillations the frequency of which is to be indicated and other oscillations, means including a variable position device to control the frequency of said other oscillations to produce a zero beat in a certain position of said variable position device and a definitely recognizable beat when said variable position device is in positions on either side of said certain position and removed therefrom by equal distances, an index for said variable position device movable over a fixed calibrated scale, a movable calibrated scale cooperating with said fixed scale, having calibrations thereon representing values equal to the calibrations on the fixed scale and spaced apart by distances double the spacing of the calibrations on the fixed scale whereby the frequency of said oscillations may be determined by moving the index to a position on the fixed scale where said readily recognizable beat is produced, moving the corresponding calibration on the movable scale to the same position, then moving the index to the other position where the recognizable beat is produced and determining the frequency from the movable scale.

2. In a frequency indicating device, the combination of means to produce a beat frequency between oscillations the frequency of which is to be indicated and other oscillations, means including a variable position device to control the frequency of said other oscillations to produce a zero beat in a certain position of said variable position device and a readily recognizable frequency in other positions of said variable position device on either side of said certain position and spaced therefrom by amounts determined by the law of operation of said means, an index for said variable position device movable over a fixed calibrated scale and a movable calibrated scale, said movable calibrated scale cooperating with said fixed scale and having calibrations bearing a relation to the calibrations on the fixed scale determined by said law of operation of said means, said movable scale being movable to bring any calibration thereon to coincide with a corresponding calibration on the fixed scale, whereby the desired frequency may be determined from the movable scale.

3. In combination, a variable position device, means for interpolating between different positions of said device, said means comprising an index movable over a fixed calibrated scale whereby the different positions to be interpolated between may be noted a movable scale cooperating with said fixed scale and said index, and having calibrations thereon which bear a relation to the calibrations on said fixed scale determined by the interpolation to be effected, whereby by moving said index to a point on the fixed scale corresponding to one of said positions, moving the corresponding point on the movable scale to coincide therewith and then moving the index to a point on the fixed scale corresponding to the other position the interpolated position may be determined from the movable scale.

4. The combination, in an interpolating device, of a scale, a second scale cooperating therewith, said scales being calibrated in terms of equal value, the corresponding divisions of said scales having different lengths determined in accordance with the interpolation to be effected, and an index movable over said scales.

5. In combination, a scale having calibrations thereon, certain of said calibrations corresponding to known values, means for determining values corresponding to other calibrations of said scale intermediate said certain calibrations, said means comprising a scale cooperating with said first mentioned scale, said last mentioned scale having calibrations thereon extending from zero upward in terms equivalent to the calibrations of said first scale, said second mentioned scale being movable to bring the zero calibrations adjacent any of said certain calibrations on said first scale, and an index movable over both of said scales.

ANATOLE P. BEREJKOFF.